United States Patent [19]

Muellner

[11] 4,381,870
[45] May 3, 1983

[54] VERSATILE CART APPARATUS

[75] Inventor: James M. Muellner, White Bear Lake, Minn.

[73] Assignee: Smarte Carte, Inc., White Bear Lake, Minn.

[21] Appl. No.: 239,971

[22] Filed: Mar. 3, 1981

Related U.S. Application Data

[63] Continuation-in-part of Ser. No. 36,211, May 4, 1979, abandoned.

[51] Int. Cl.³ .............................................. B62B 3/12
[52] U.S. Cl. ........................... 280/33.99 B; 280/47.35; 280/47.4; 297/118; 297/233; D34/21
[58] Field of Search .............. 280/33.99 R, 33.99 A, 280/33.99 B, 33.99 S, 47.34, 47.35, 47.38, DIG. 4, 47.4; 297/232, 233, 243, 118; D12/22, 26

[56] References Cited

U.S. PATENT DOCUMENTS

| D. 206,116 | 11/1966 | Hughes | D14/3 |
|---|---|---|---|
| D. 230,142 | 1/1974 | Muellner | D12/2 |
| 1,546,220 | 7/1925 | Eriksen | 297/233 X |
| 1,807,262 | 5/1931 | Wages | 297/233 X |
| 2,435,733 | 2/1948 | Belyeu | 280/47.38 X |
| 2,436,991 | 3/1948 | Dirksen | 280/33.99 B |
| 2,443,236 | 6/1948 | Gallagher | 280/47.35 |
| 2,470,040 | 5/1949 | Mackin et al. | 280/47.38 X |
| 2,583,196 | 1/1952 | Zander et al. | 280/47.35 |
| 2,796,155 | 6/1957 | Cabler | 280/47.35 X |
| 2,992,010 | 7/1961 | Sides | 280/47.35 X |
| 3,497,234 | 2/1970 | Schray | 280/47.35 X |
| 3,978,959 | 9/1976 | Muellner | 194/4 R |

*Primary Examiner*—David M. Mitchell
*Assistant Examiner*—Michael Mar
*Attorney, Agent, or Firm*—Merchant, Gould, Smith, Edell, Welter & Schmidt

[57] ABSTRACT

An improved versatile cart (20) structure is the subject of this invention. The cart (20) has a lower frame structure (20) for supporting bulky objects, a pair of spaced upright supports (30) extending from the lower frame (22) and an upper frame structure (30.1a) extending rearwardly from the upright support (30) and over the lower frame (22) in spaced relationship, for carrying objects and also forming a guide handle (32) for the cart (20). In preferred form, the cart (20) is configured for nesting engagement with similarly styled carts and for use for automatic cart vending systems. A unique wheel structure supports the cart (20) in a manner that enables stable positioning of the cart (20) on escalators. In one configuration, the cart (20) forms a luggage carrier having a child seat convertible to an adult seat for use as a temporary wheelchair.

42 Claims, 11 Drawing Figures

VERSATILE CART APPARATUS

CROSS-REFERENCE TO RELATED APPLICATION

This application is a continuation-in-part of applicant's copending application Ser. No. 036,211, filed May 4, 1979, now abandoned.

TECHNICAL FIELD

This invention relates broadly to cart apparatus. More particularly, this invention relates to personalized self-service carts of the type used to carry bulky or heavy items such as luggage or shopping bags over significant distances such as in transportation terminals or in large shopping center complexes.

BACKGROUND OF PRIOR ART

The need for rugged, low-maintenance and versatile self-service carts for personalized use in large public areas is clearly evident. Modern sprawling shopping centers (such as shopping malls) and large transportation passenger terminals (such as airports) exemplify a common need for such carts, in two diverse use applications. While each such use has differing special purpose requirements (e.g. the shopping center typically requires a cart for holding a plurality of packages, while the passenger terminal requires a cart for carrying heavy and/or bulky luggage), both have many common requirements. For example, both applications generally find a need for a child seat. Both require a cart that will withstand continuous day-to-day use and abuse by the public, with minimal required maintenance. Both require carts that can be readily used and accepted by the public, with minimal disruption to the business activities of the business establishment.

A number of different cart designs have been used for such applications in the past, most being special-purpose in nature. Shopping centers have typically used relatively small carts particularly intended as strollers, and offering little in the way of package carrying capability. For the most part, such strollers have, over time, become a nuisance to the business proprietors, both from maintenance and cart-distribution standpoints. Relatively few cart systems have been used successfully in transportation facilities due to a number of differing problems such as theft, unmanageability of free cart systems and cart distribution problems. With the huge traffic flow through today's busy terminals, however, the terminal baggage attendants cannot begin to handle the luggage handling needs of such establishments.

One cart system that has and is experiencing considerable success in airport terminals, and which offers the same use flexibility potential to shopping centers, is the automatic self-servicing cart vending system that provides a reward for return of the cart to strategically positioned vending islands. Such a system is described in U.S. Pat. No. 3,978,959, by the inventor hereof. In that system, the individual carts cooperatively engage with one another in "nesting" relationship, enabling high packaging density in a relatively small vending island, thereby offering considerable space-saving and order to cart distribution throughout a facility.

While the cart design disclosed in U.S. Pat. No. 3,978,959, for use with the vending island system has displayed considerable success in passenger terminals, its usage has illustrated several areas in which improvements to the cart are desireable in order to improve versatility of the cart to both the shopping center and passenger terminal applications. For example, there is frequent need in passenger terminals for wheel chairs to move aged or disabled persons for short periods of time across the expanses of such terminals. Prior art luggage cart designs did not allow for safe carrying of adults on such carts. Therefore, the maintenance and policing of an adequate supply of wheel chairs for such purposes has been both impractical and costly for passenger terminal management. Similarly, most passenger terminals, like shopping centers, typically use escalators as the primary mode of movement between different floor levels. However, known prior art luggage carts, baby strollers and shopping carts have not been designed for safe, stable, or convenient use on escalators. With most prior art carts and strollers the bottom frame portion of the cart hangs up on or catches on the escalator stair treads, thus not allowing the cart wheels to continuously support the cart on the escalator in a safe and stable manner.

These are several of the problems addressed by the cart design of the present invention. The versatile self-service cart design of the present invention overcomes many of the deficiencies of prior art carts, and offers a versatile cart design which can be readily adapted for use in such differing environments as passenger terminals and shopping centers. As will become apparent upon a more detailed description of the invention, the present cart offers such improved use-versatility, without sacrificing ruggedness of construction, high reliability or its use in automatic self-service vending systems as described in U.S. Pat. No. 3,978,959.

SUMMARY OF THE INVENTION

The present invention comprises an improved versatile cart particularly designed for multi-purpose usage in such diverse environments as in transportation terminals and shopping center complexes. The cart is designed so as to be usable on escalators in a stable upright manner, regardless of whether the cart precedes or follows its user, and for either rising or descending escalator conditions. The basic cart structure lends itself flexibility for minor feature additions which adapt the cart for particular use requirements in differing environments, for example for usage as a luggage cart for passenger terminal applications, and a package-carrying cart for shopping center applications. The cart also includes a feature which enables rapid convertability of a child-carrying seat, to an adult-carrying seat such that the cart can be used in temporary wheel chair manner, to a structure having two child-carrying seats. While the principles of this invention apply to carts which may or may not matably stack or "nest" with one another so as to minimize storage space therefor, the cart design of the preferred embodiment of this invention comprises a cart specifically configured for matable nesting with carts of like-construction.

The basic cart design comprises a lower frame defining a broad upper surface suitable for carrying a plurality of relatively bulky items such as suitcases or luggage items, when used in passenger terminals, or shopping packages, when used in shopping center applications. The lower frame is generally symmetrically disposed about a longitudinal axis and extends between longitudinally spaced forward and trailing ends. A pair of upright side support members are mounted to the lower frame adjacent the forward end and at opposite sides of the lower frame, and rise generally vertically upward therefrom, to support an upper frame structure connected thereto. The upper frame structure is generally symmetrically disposed about a longitudinal axis and extends rearward from the upright support members so as to overlie, in generally parallel, spaced relationship, the lower frame. The upper frame portion itself is of suitable strength to supportably carry heavy or bulky items. A child-carrying seat structure is mounted at the forward end of the cart, and rests between the upright side support members for supportably carrying a child in seated position thereon. The child seat basically includes a lower broad seat portion transversely mounted between the upright side support members and spaced above the lower frame, a back support upwardly extending from one edge of the lower seat and spaced forward of the back support, for retainably holding a child from sliding in the forward direction out of the seat. Wheel support means which could be mounted to either the lower frame or the upright side support members adjacent the forward end of the frame, support the cart for guidable movement over a floor surface. In a preferred embodiment of the invention, the wheel support means includes a pair of coaxially aligned primary support wheels mounted to the lower frame at the forward end thereof and at opposite sides thereof, and a caster which is rotatable about an upright axis and is mounted to the lower frame along its longitudinal axis and adjacent the trailing end of the frame. The combination of the manner in which the wheel support means supports the lower frame, the relative sizing of the primary support wheels with respect to that of the caster, and the longitudinal spacing between the primary support wheels and the caster adapt the cart for usage, in a stable upright manner, on an escalator. When the cart is placed upon an escalator, regardless of which end (i.e. forward or trailing) is first placed upon the escalator, and regardless of which direction (i.e. rising or descending) in which the escalator is moving, the primary support wheels and caster remain in constant engagement with the tread portion of adjacent escalator stair treads. This is true regardless of where the primary support wheels and the caster are positioned upon those treads, in a manner preventing the lower frame portion of the cart from engaging or catching upon the underlying stair tread. The rearward portion of the upper frame of the cart defines a relatively wide transversely extending handle, enabling a cart user to firmly grasp and maintain the cart on the escalator in such stable manner during the ascent or descent of the escalator.

Conversion means are provided and form an integral part of the cart, for converting the child seat into a seat suitable for supportively carrying an adult, enabling the cart to be used in a temporary wheel chair capacity. The preferred embodiment of the adult seat conversion means includes a seat portion pivotally mounted to the back support portion of the child seat and is rotatable about and up over the top of the child seat back support to cooperativley engage the forward retention bar and the back support of the child seat, to form an adult seat which overlies the child seat. This embodiment of the cart design also includes a foot rest mounted to the forward end of the cart adjacent the primary support wheels for holding the feet of an adult person seated on the adult seating surface. When not required for adult seating, the conversion seat can be rapidly pivoted out of engagement with the transverse retaining bar, in an out-of-the-way manner lying next to the child seat back support. In this embodiment of the invention, which is particularly suited for passenger terminal use, an upwardly projected retaining member, pivotally mounted at the trailing end of the lower frame, can retainably hold items, such as luggage, from sliding off the trailing end of the lower frame, and is particularly useful when the cart is used on escalators.

The seat portion of the adult seat conversion means can be pivotally mounted to the back support portion of the child seat for movement between three positions. In the first position, the seat portion is generally parallel to, and overlying, the child seat as described above. In a second position, the seat portion is disposed generally perpendicular to the child seat and forms an extension of the back support of the child seat. In its third position, the seat portion is generally parallel to the child seat and extending rearwardly from the top of the child seat back support. With the seat portion in this third position, it functions as a second child seat or can be used as a differently positioned adult seat in accordance with the wishes and needs of the user of the cart.

Means can be provided to maintain the seat portion in its third position. These means can be detachable and can include at least one generally L-shaped member. When attached to the cart, the L-shaped member has a generally vertically extending leg and a generally horizontally extending leg. The remote end of the generally vertically extending leg is attached to the cart at a support member connected to the upper frame and extending transversely between opposing sides thereof. The remote end of the generally horizontal leg is attached to the cart proximate the top of the child seat back support. It is along this edge that the axis about which the seat portion rotates extends. With the seat portion in its third position, it is seated on the generally horizontal leg of the L-shaped member.

The cart design of this invention is particularly suited for usage in stacking or nesting with carts of like construction. To facilitate the nesting function, the caster is mounted along the longitudinal axis of the lower frame, and the lower frame tapers in the longitudinal direction from a broad dimension at the forward end thereof to a relatively narrower dimension at the trailing end thereof, and defines an open wheel passageway along the longitudinal axis from the forward end extending backward through the frame toward the caster. The width dimension of the wheel passageway is sized greater than the diameter of the caster such that when a second cart is nested with a first cart, the lower frame trailing end of the second cart advances in the longitudinal direction, rearwardly past the lower frame forward end of the first cart and between the upright support members of the first cart, with the caster of the second cart advancing longitudinally rearwardly within the lower frame wheel passageway of the first cart.

To further improve the nesting property of the carts, the lower frame, as mounted upon the wheel support means defines an acute angle with the floor support surface, wherein the acute angle opens in the direction from the forward end to the trailing end of the lower frame. This angular positioning of the lower frame enables the trailing end of the lower frame of a second cart to override the forward end of the lower frame of a first cart, when backing into nesting engagement with the first cart. An acute angle for such lower frame from approximately 5 degrees to 15 degrees is preferred. Further, for such carts usable in self-service automatic vending systems, the preferred diameter of the primary support wheels is approximately from 4 to 12 inches, and preferably between 6 and 10 inches. This primary support wheel size also readily accommodates the escalator usage mode of operation for the cart.

Another feature of the cart design as applicable to nesting carts is a pair of stop members mounted to the lower surface of the lower frame, for cooperatively engaging the forward end of the lower frame of a rearwardly disposed cart in nesting engagement with the cart having the stop members. Such stop members are placed on the lower frame such that the outer circumferential surfaces of the primary wheels of the two nesting carts are longitudinally spaced and aligned with one another, thus permitting a large number of such nesting carts to be readily directed and moved along curved paths.

While the present invention will be described with respect to a particular 3-wheeled cart construction, it will be understood that the invention is broad enough to cover alternative cart designs having more than three wheels. Further, while the invention will be described with respect to an embodiment employing a particular nesting design, it will be understood that the invention described herein applies equally well to carts not having nesting capabilities. Further, while the preferred embodiments of this invention describe a cart of particular tubular structure, it will be understood that other structures embodying the principals described herein, likewise fall within the spirit and broad scope of this invention.

Various advantages and features of novelty which characterize the invention are pointed out with particularity in the claims, annexed hereto and forming a part hereof. However, for a better understanding of the invention and its advantages obtained by its use, reference should be had to the Drawings which forms a further part hereof and to the accompanying descriptive matter in which there are illustrated and described several embodiments of the invention.

BRIEF DESCRIPTION OF THE DRAWING

Referring to the Drawing, wherein like numerals represent like parts throughout the several views.

DETAILED DESCRIPTION OF THE INVENTION

Referring to the figures, there is generally illustrated at 20 a first embodiment of a cart constructed according to the principals of this invention. The cart 20 is of a type particularly suitable for use in carrying luggage in passenger terminals, and is also applicable for use in self-service automatic vending systems of the type described in U.S. Pat. No. 3,978,959. Referring to FIGS. 1 through 5, the cart 20 generally has a lower frame portion 22 generally symmetrically configured about a longitudinal axis 25, and extending from a first or forward end, generally designated at 22a, and a second or trailing end, generally designated at 22b. The lower frame 22 is, in the preferred embodiment, of tubular construction, and is, in the preferred embodiment, constructed of tubular steel members, as are the other tubular members of the cart, which are chrome plated for improved wear and aesthetic appearance. In the preferred embodiment, the lower frame 22 has an outer, generally U-shaped tube 22.1, being open at the forward end and extending rearward toward the trailing end and being closed at the trailing end. The transverse width of the outer tube 22.1 tapers from a generally broad width at the forward end 22a, to a relatively narrower width at the trailing end 22b, for enhancing nesting of the cart with other carts of like-configuration, as described in more detail hereinafter. A first transverse brace member 22.2 is mounted to, and extends between, the opposing legs of the U-shaped outer member 22.1 and is spaced relatively closer to the trailing end 22b of the cart, as opposed to its distance from the forward end 22a of the lower frame. A second transverse brace member 22.3 is mounted to and interconnects the oppositely disposed leg members of the outer frame 22.1, adjacent the trailing end 22b thereof. A caster mounting member 26 is disposed between and mounted to the first and second transverse brace members 22.2 and 22.3 respectively. A pair of generally L-shaped inner brace members 22.4 respectively connect the forward ends of the leg portions of the outer U-shaped frame portion 22.1 with intermediate portions of the first transverse brace member 22.2. A pair of intermediate tubular braces 22.5 generally extend in a longitudinal direction of the lower frame 22 and are mounted between the pair of L-shaped brace members 22.4 at the forward end 22a of the cart, and extend back to the first transverse brace member 22.2. The respective tubular portions collectively comprising the lower frame (i.e. 22.1–22.5) are generally mounted in a common plane, and their respective upper surfaces collectively define a broad support surface particularly suitable for carrying items of luggage or baggage, and other bulky items, as generally illustrated at 100 in FIG. 3. Also, the collective members forming the lower frame portion 22 define a generally smooth surface in the longitudinal direction for preventing catching thereof on escalator stair treads, as hereinafter described in more detail.

Figure 3:
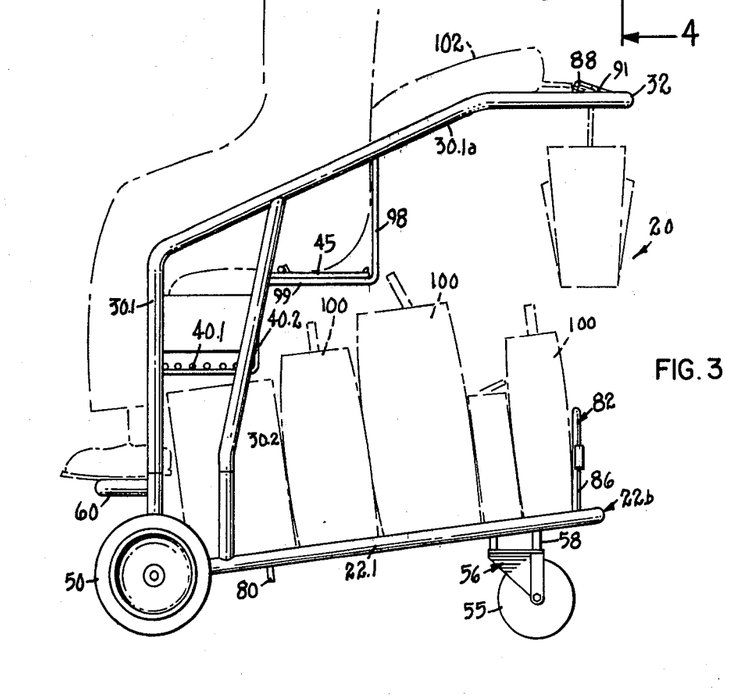
FIG. 3 is a side elevational view of the cart illustrated in FIG. 1 with fantom lines showing a person seated on the seat portion, a purse, and luggage.

Lower frame 22, at the trailing end 22b thereof, can have a pivotally mounted retaining member 82. Retaining member 82 is disposed for pivoting about the longitudinal axis of a transverse member 84 thereof. Member 82 can be positioned with retaining portions 86 extending generally vertically to preclude movement of luggage 100 positioned on lower frame 22 beyond the trailing 22b of the frame.

When the cart is not in use and it is desired to nest a number of the carts together in a manner hereinafter described, retaining member 82 can be pivoted so that retaining portion 86 thereof is aligned generally with lower frame 22 and essentially forming an extension of the upper support surface thereof. With retaining member 82 in this position, a foot rest 60, which is positioned at a height above the highest point of lower frame 22, will not be obstructed by the retaining member 82 of a similar cart as two carts are nested together.

A pair of upright side support members, generally designated at 30 are mounted to the outer member 22.1 of the lower frame 22, adjacent the forward end 22a thereof and rise upward therefrom in a generally vertical plane. In the preferred embodiment, each upright side support member 30 includes a pair of tubular members 30.1 and 30.2 respectively. The foremost member (30.1) of the two side support members 30 are, in the preferred embodiment, part of the same tubular member (see FIG. 1), extending in generally U-shaped manner in overlying relationship to the lower frame portion 22. The second member 30.2 comprising each pair of upright side support members 30 forms an interconnecting brace between the lower frame member 22.1 and the upward generally horizontally positioned portion of the first side support member 30.1. The second tubular member 30.2 of the upright side support members 30 forms a supporting brace and is slightly angled, beginning approximately at its midpoint, toward the trailing end 22b of the cart.

Figures 1, 2:
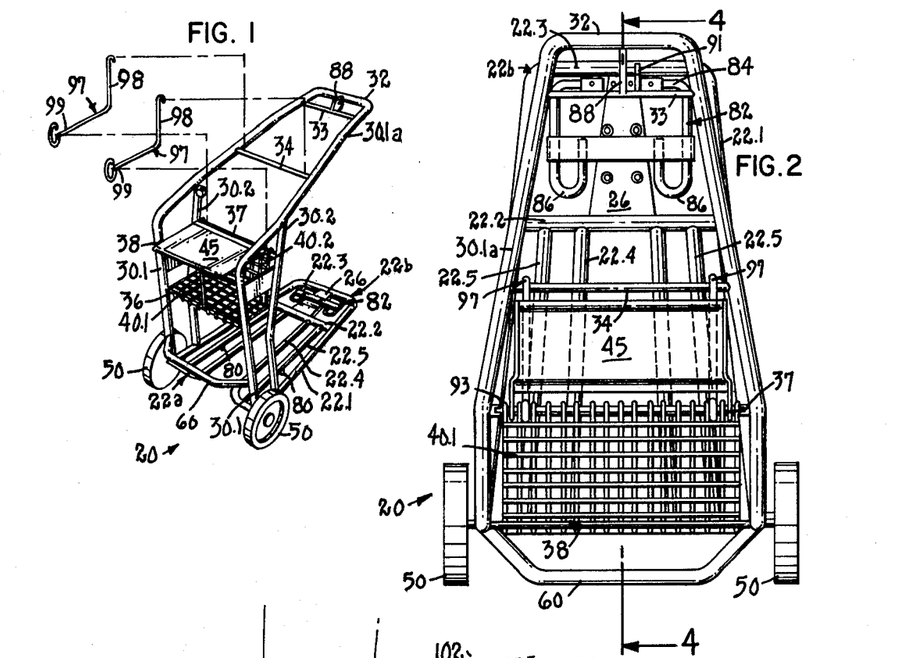
FIG. 1 is a perspective view of a cart constructed according to the principles of this invention with a pair of L-shaped members shown exploded from the cart.
FIG. 2 is a top plan view of the cart disclosed in FIG. 1.

The upper, generally horizontally disposed portion of the member 30.1 defines an upper frame portion of the cart, operatively connecting the pair of upright side support members, and lying generally symmetrically disposed about a vertical plane passing through the longitudinal axis 25. For later reference in distinguishing the "upper" frame portion of the tubular member 30.1 from the "lower" portion thereof, which forms a part of the side support members 30, the "upper" generally horizontally disposed portion of the member 30.1 has been designated with the notation 30.1a. The upper frame 30.1a, in top plan, as illustrated in FIG. 2, is configured in a tapered manner from the forward end of the cart 22a toward the trailing end of the cart 22b, as illustrated, and substantially overlies the lower frame 22 and extends rearward of the trailing end 22b thereof. The upper frame portion 30.1a terminates at a transversely extending handle portion (designated as 32 for ease of reference) which is wide enough to enable case of control of a person using the cart for steering the cart, and offers adequate size to enable the user to firmly grasp and retainably hold the cart in stable position upon an escalator, as will become apparent upon a more detailed description of the invention.

A pair of transversely extending rod members 33 and 34 are connected between the opposing legs of the upper frame portion 30.1a. The transverse rod member 33 is mounted adjacent the handle 32, and is particularly useful for retainably holding hanging articles or garment bags. The transverse rod member 34 is mounted to the upper frame 30.1a at a position longitudinally spaced rearward from the juncture of the upright support frame member 30.2 with the upper frame 30.1a, and provides a back rest member for an adult seated upon the cart, as hereinafter described. The upper frame 30.1a and the transverse rod members 33 and 34 collectively form an upper support surface suitable for supportively carrying bulky items of luggage and the like, in overlying relationship to their lower frame 22, providing the cart with a large carrying capacity.

In one embodiment, the cart can include a loop 88 projecting from the cart proximate transverse rod member or cross-brace 33. Loop 88 extends upwardly from the upper support surface of the upper frame 30.1a. Consequently, hanging wearing apparel 102 suspended from clothing hangers 103 can be draped across the upper support surface of upper frame 30.1a with shank portions of a hanger 103 hooked through loop 88.

For ease in attachment of the hanging apparel 102, loop 88 can comprise a non-linear rod aligned generally along the longitudinal axis of upper frame 30.1a. It can be made to extend, at one end, from handle 32 and, at its other end, from transverse rod member 33.

The cart can further include a purse suspension element 90 extending generally longitudinally from either handle 32 or transverse rod member 34. Purse suspension element would appropriately extend from the element to which it is attached toward either member 34 or handle 32 respectively. So located, it would be easily accessible to the user of the cart. Suspension element 90 can have a free end portion 91. Portion 91 can be bent upwardly and back upon suspension element 90 so that a strap of the purse could be more securely retained, and the purse would be less likely to be stolen.

Figure 4:
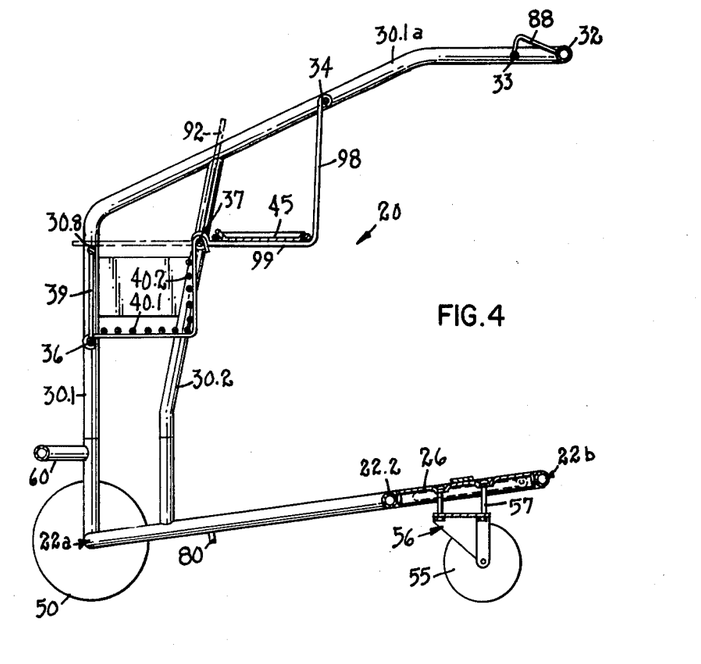
FIG. 4 is a cross-sectional view of the cart illustrated in FIG. 2 generally taken along the line 4—4 FIG. 2.

The pair of upright side support members 30 are connected by first, second and third transversely extending brace members respectively designated as 36, 37 and 38 (see FIG. 4). The first transverse brace member 36 is mounted transversely between the spaced forward support members 30.1 and forms a first mounting support for a child seat 40. The second transverse brace member 37 is mounted transversely between the opposing second support rods 30.2 comprising in part the upright side support members 30, and forms a second mounting support for the child seat 40. The child seat 40 is formed, in the preferred embodiment, from rigid wire mesh, and includes a lower seat portion or planar member 40.1 and an upright back rest portion 40.2. The lower child seat portion 40.1 snaps onto the first transverse rod support member 37, as illustrated in FIG. 4. The third transverse rod member 38 forms a retaining bar for retainably holding a child seated on the seat from falling in the forward direction off of the seat. A short dividing bar 39 can be mounted between the first and third transverse rod members 36 and 38 respectively, forming a leg divider for the child seat, to inhibit twisting motion of a child seated within the seat 40 and climbing of the child out of the seat 40.

A second seat support surface or planar member 45 is pivotally mounted to the second transverse brace member 37 for pivotal movement about the longitudinal axis thereof. The oppositely disposed, "free" end of the seat member 45 is slightly curved so as to snugly fit against the third transverse brace member 38 when in position engaging member 38. In that position, the second and third transverse brace members 37 and 38 fully support the seat surface 45, which forms a supportive surface for carrying an adult in a seated position. In this mode of operation, the adult seat 45 transforms the cart 20 into a temporary wheelchair for transporting persons.

Figures 8, 9, 10, 11:
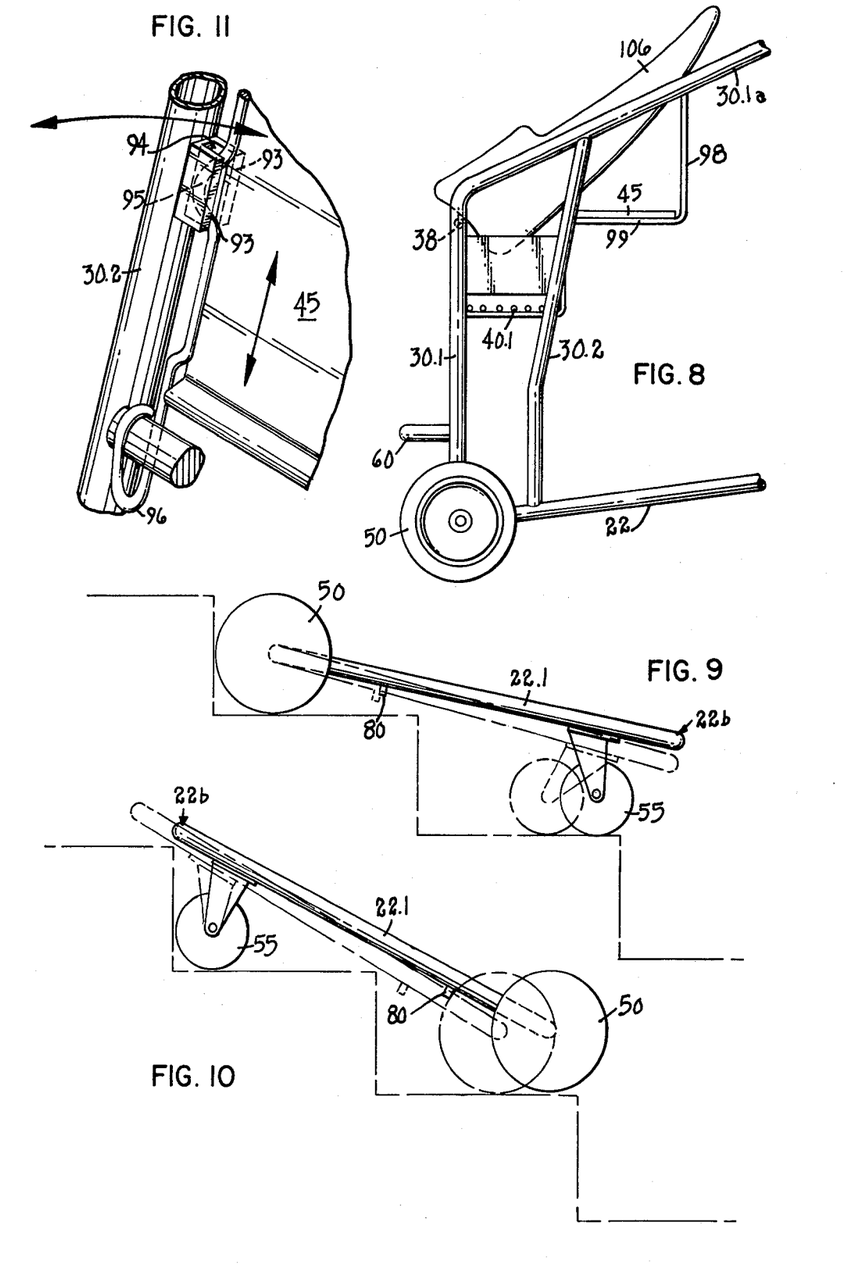
FIG. 8 is a fragmentary view of the forward portion of the cart illustrated in FIG. 3, illustrating usage of the child seat portion of the cart for supporting a detachable infant seat.
FIG. 9 is a diagrammatic side view illustrating the wheel support assembly and lower frame portion of a cart constructed according to the principles of this invention, as they would appear when supported upon adjacent stair treads on an escalator, wherein the primary support wheel is positioned higher than the caster, and illustrating two possible positions thereof depending upon the rotational orientation of the caster.
FIG. 10 is a diagrammatic side view illustrating the wheel support assembly and lower frame member of a cart constructed according to the principles of this invention, as they would appear when supported upon adjacent stair treads on an escalator, wherein the primary support wheel is positioned lower than the caster, illustrating two possible positions thereof depending the rotational orientation of the caster.
FIG. 11 is an enlarged fragmentary view of the adult seat portion as pivotally mounted for movement about an axis and showing the seat portion as maintained in a second position thereof.

Seat surface 45 can be maintained in a generally vertical position as indicated in phantom line at 92 in FIG. 4 so as to form an extension of back support surface 40.2 of the child seat 40. This can be accomplished by providing a pair of flanges 93, as best illustrated in FIG. 11, extending from one of the second support rods 30.2. Together these flanges 93 define a channel 94 therebetween.

Seat surface 45 can be provided with a laterally extending nub 95 which can be seated in channel 94 to preclude pivoting movement of surface 45. Seat surface 45 can be mounted to rod support member 37 by a pair of elongated eyes 96. When nub 95 is seated in channel 94, that portion of eye 96 closest to nub 95 engages support member 37. As it is desired that seat surface 45 be pivoted to another position, it is moved generally parallel to second support rods 30.2, in a direction indicated by the linear arrow, so that nubs 95 escape channel 94. Elongated eyes 96 have a dimension sufficiently long to permit this movement. Once nub 95 escapes channel 94, seat member 45 may be pivoted to a new position.

Once nub 95 is released from channel 94, seat surface 45 can pivoted rearward about support member 37 to a third position. This third position is generally a rear-extension of the first position which surface 45 occupies when it overlies lower seat portion 40.1 in he temporary wheelchair mode.

The cart can include detachable means for maintaining seat surface 45 in this third position. This means can include a generally L-shaped member 97 which has, when it is attached to the cart, a generally vertical leg 98, and generally horizontal leg 99. A remote end of vertical 98 is attached at transverse rod member 34, and a remote end of horizontal leg 39 is attached at support member 37. In its third position, seat surface 45 is seated upon horizontal leg 99 of the L-shaped member 97. FIG. 1 illustrates two L-shaped members 97, each of which can be positioned along support surface 45 at opposite ends thereof.

The cart 20 is supported for movement by wheel support means comprising a pair of primary support wheels 50 and a caster 55. The primary support wheels 50 are mounted on stub axle extensions 51 projecting outwardly from the sides of the lower frame 22 at the forward end 22a thereof such that the primary support wheels 50 are coaxially aligned and project outwardly from the lower frame 22. The caster 55 is mounted to the caster mount 26 by means of a caster mounting apparatus, generally designated at 56, for pivotal movement about a generally vertical axis 57 (see FIG. 4). Spacer members 58 are provided between the caster mounting apparatus 56 and the caster mount surface 26 for orienting the caster axis 57 in a generally vertical orientation.

Figure 5:
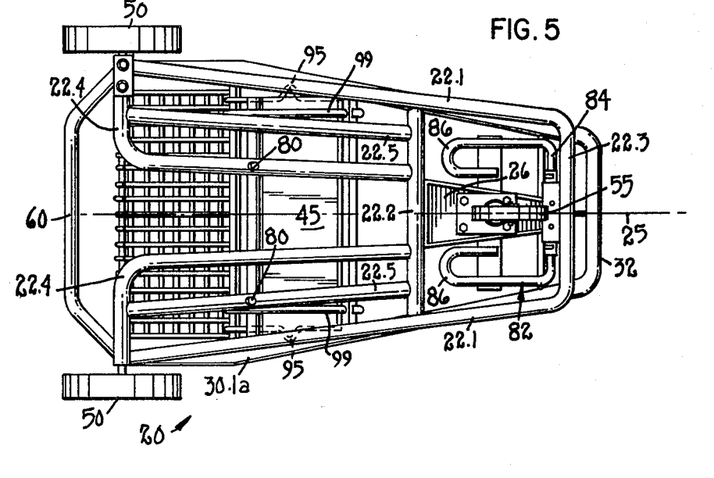
FIG. 5 is a bottom plan view of the cart illustrated in FIG. 1.
Figure 6:
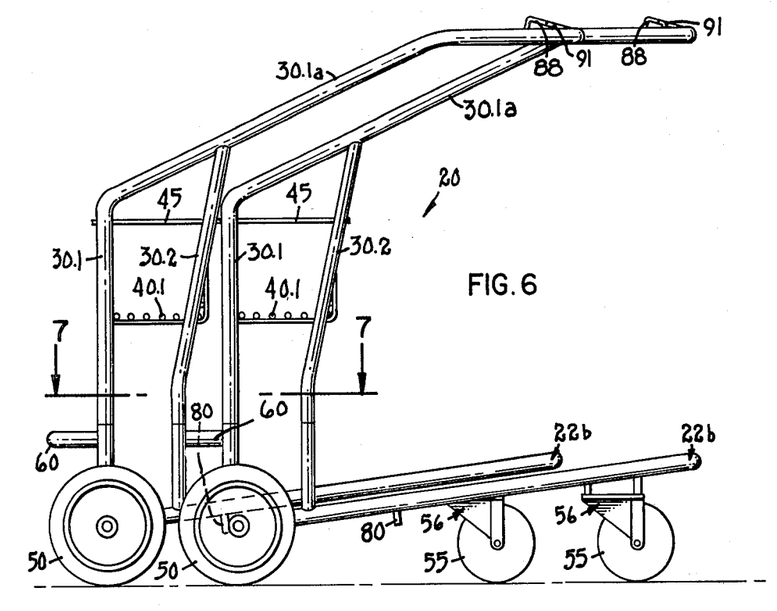
FIG. 6 is a side elevational view of a pair of carts such as illustrated in FIG. 1, illustrating how such carts nest together.
Figure 7:
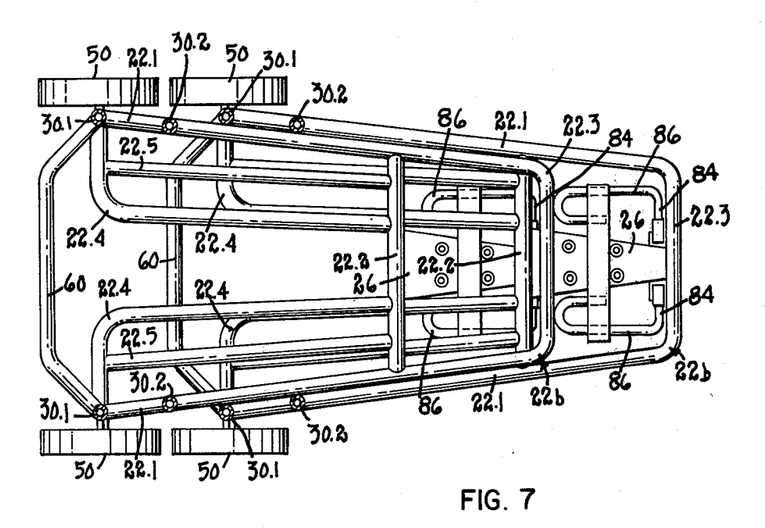
FIG. 7 is a top plan sectional view of the nested carts illustrated in FIG. 6, generally taken along the line 7—7 of FIG. 6.

The embodiment of the cart just described, is particularly suitable for nesting engagement with carts of like-construction. Referring to FIG. 5, it will be noted that the width or spacing between the inner brace members 22.4 about the longitudinal axis 25, is sized so as to permit unimpeded passage of a caster 55 and its support apparatus 56 therebetween, when a second cart is nested with the first cart as illustrated in FIGS. 6 and 7. This is true regardless of rotational orientation of caster 55. The nesting function of the cart is further enhanced by the tapered construction of the upper and lower frame portions 30.1a and 22 respectively of the cart, as illustrated in FIGS. 6 and 7. The tapered feature enables the trailing end of a forward-disposed cart to be easily placed between the spaced pair of upright side support members 30, and acts as a guide for positioning the two carts into full nesting position, with a minimal amount of force or effort required. To further assist in nesting of the carts, the lower frame portion 22 is mounted on the wheel support mechanism at an angle with respect to the lower floor surface. This angle enables the lower frame portion of a forwardly disposed cart to ride above the upper surface of the lower frame portion of a rearwardly disposed cart when in nesting engagement, as illustrated in FIGS. 6 and 7. The acute angle can range preferably from 5 degrees to 15 degrees, and more preferably will be between 5 degrees and 9 degrees. In the preferred embodiment of the invention illustrated in the Figures, the acute angle is approximately 7.5 degrees.

The size of the primary support wheels 50, as well as the size of the caster wheel 55 can vary depending upon the particular application to which the cart is to be put. The diameter of the primary support wheel can preferably vary from between 4 to 12 inches and more particularly between 6 and 10 inches. In the preferred embodiment of the invention illustrated in Figures, a diameter of 8 inches for the primary support wheel has been found to work particularly well in escalator applications, and for usage of the cart 20 with self-service automatic vending systems, previously referred to. The diameter dimension of the wheel portion of the caster 55 can similarly vary, and preferably will be between $2\frac{1}{2}$ and $7\frac{1}{2}$ inches. In the preferred embodiment of the invention disclosed, a caster diameter of approximately 5 inches has been found to operate satisfactorily.

Another application for the transverse brace members 38, 37 and 34 is for securely supporting an infant seat generally designated at 106 in FIG. 8. While only several use applications for the cart have been illustrated in the Figures, it will be understood that many other applications for the cart construction described by this invention, can be envisioned, within the spirit and intent of this invention.

A pair of stop members 80 downwardly project from, and are mounted to, the intermediate tubular braces 22.5 of the lower frame 22 (see FIGS. 3, 4, and 5). The stop members 80 are longitudinally positioned on the lower frame 22 a distance slightly greater than the diameter of the primary support wheels 50, and serve the function of spacing the primary support wheels of two successively nested carts from one another to permit ease of steering and movement of a large number of such carts when in nested engagement. The stop members 80 retainably engage the forward surface of the inner brace members 22.4 of a rearwardly positioned nesting cart.

The configuration of the cart makes it particularly suitable for use on escalators, in an upright stable manner, wherein only the primary support wheels 50 and the caster 55 engage the stair treads of an escalator. The smooth-bottom nature of the lower frame 22 in the longitudinal direction, prevents the frame from hanging up on or getting caught within the stair treads of an escalator. Further, the wheel and caster positioning and dimensioning, combined with the angle formed between the lower frame 22 and the support surface upon which the cart is normally moved, prevent the lower frame portion 22 from engaging the escalator stair treads. This condition is illustrated in more detail in FIGS. 9 and 10. Referring thereto, FIG. 9 illustrates the primary support wheel 50 and the caster 55 supporting the lower frame 22 on an escalator, wherein the primary support wheel is disposed relatively higher than the caster 55. The full-line designation illustrates the frame 22 as it would be positioned when the caster 55 is oriented at a position so as to maximize the longitudinal spacing between the caster and the primary support wheel 50. The dashed-lined illustration illustrates the lower support frame 22 in the position in which it would appear when the caster 55 is disposed in a manner about its support axis, so as to minimize the spacing between the primary support wheel and the caster. In either condition, it will be noted that the lower frame 22 clears the underlying stair tread of the escalator at all points therealong. This condition enables stable placement of the cart upon the escalator, since the cart squarely rests only upon the wheel support means of the cart with bags carried maintained there between, and can be easily retainably held in that position by a user of the cart, by means of the broad transverse handle 32.

FIG. 10 illustrates the same escalator use conditions as previously described with respect to FIG. 9, except that in FIG. 10, the primary support wheel 50 is disposed relatively lower on the escalator treads than the caster 55. In FIG. 10, the position of the primary support wheel 50 is illustrated as it would move relative to the caster, if the caster were to remain firmly engaged against the riser of the escalator.

The representations illustrated in FIGS. 9 and 10 are diagramed as they would appear for a cart using the dimensions of a cart built according to the preferred embodiments of this invention (i.e. with a primary support wheel diameter of 8 inches, a caster diameter of 5 inches, and acute angle rise for the lower frame 22 of 7.5 degrees, and a center line dimension between the primary wheel center line and the caster axis of 22 inches), as used upon a relatively standard escalator having typical dimensions of approximately 13½ inch stair tread length and approximately an 8 inch riser dimension.

It will be understood that variations can be made to the various dimensions described as being preferred dimensions with respect to a description of the preferred embodiments herein, which will still provide a cart that can be stably used and supported upon an escalator, and which will remain within the scope of this invention. For providing a cart design which will enable the cart to be stably used upon a moving escalator such that the lower frame 22 will not engage the underlying escalator treads, this invention contemplates a range of primary wheel diameter sizes from approximately 4 inches to 12 inches, and a relative spacing between the center line of the primary wheel (i.e. the tangent point of the primary wheel with a support surface when the cart is supported upon a generally planar surface) and the center line of the caster from approximately 15 inches to 30 inches. In combination with the just-cited dimensions, if the lower frame portion 22 is mounted at an angle with respect to the lower support surface (i.e. a ground surface), the invention contemplates values from approximately 5 degrees to 15 degrees for that angle. It will be recognized that once the diameter dimension of the primary support wheel and the lower frame angle dimension are specified so as to achieve the escalator use purposes of this invention, the actual caster size is not particularly relevant, since spacing means can be provided between the caster support apparatus and the caster mounting base for achieving the desired and required angle.

While the present invention has been described with respect to a particular cart embodiment illustrating usage of the invention as a luggage cart, it will be understood that many other varying configurations of the basic cart design can be envisioned within the spirit and scope of this invention. Further, while particular constructions of the cart disclosed with respect to the preferred embodiment of the invention have been described, it will be understood that many alternate variations of such construction are contemplated by the present invention. For example, while a generally tubular cart construction has been illustrated, it will be understood that other forms of cart construction could be used. Further, while the disclosed preferred embodiment of the invention has used a particular 3-wheeled configuration of a nesting cart design, it will be understood that other variations of such nesting carts can be constructed within the scope of this invention. Further, the principles of this invention apply to cart structures in general, whether or not such cart structures are of a nesting type; however, this invention finds particular merit for its application with carts of the nesting type.

From the foregoing description, it will be appreciated that the present invention solves many of the problems and deficiencies associated with the prior art cart designs. The cart of this invention is particularly suitable for escalator use in a safe stable manner, and offers significant flexibility for usage in such diverse environments as passenger terminals and shopping center complexes. The basic cart design can be readily adapted for incorporating features particularly suitable for the environment in which it is to be used, as for example the selective convertability of a child carrier seat to an adult seat or temporary wheelchair purposes.

Other modifications of the invention will be apparent to those skilled in art in light of the foregoing description. This description is intended to provide specific examples of individual embodiments clearly disclosed in the present invention. Accordingly, the invention is not limited to the described embodiments, or to the use of specific elements therein. All alternative modifications and variations of the present invention which fall within the spirit and broad scope of the appended claims are covered.

I claim:

1. An improved multipurpose luggage cart, comprising:
    (a) a lower frame defining a broad upper support surface suitable for supportably carrying a plurality of luggage items, said lower frame being generally symmetrically disposed about a longitudinal axis and extending between longitudinally spaced forward and trailing ends;
    (b) wheel support means for movably supporting said lower frame on a floor surface, comprising:
        (i) a pair of spaced primary support wheels coaxially mounted to said lower frame adjacent said forward end and at oppositely disposed sides thereof; and (ii) a caster, rotatable about a vertical axis, mounted to said lower frame along its longitudinal axis and adjacent said trailing end thereof;

(c) a pair of upright support members mounted to said lower frame adjacent its forward end and at opposite sides thereof, and rising generally vertically upward therefrom;

(d) an upper frame operatively connecting said pair of upright support members and defining a broad upper support surface suitable for supportably carrying bulky luggage items, said upper frame being generally symmetrically disposed about a longitudinal axis and extending rearward from said upright support members, and overlying in generally parallel spaced relationship, said lower frame;

(e) a first substantially planar member extending generally horizontally between said upright support members; and (f) a second substantially planar member pivotally mounted between said upright support members for rotation about an axis spaced above and extending generally parallel to, said first planar member, and configured for selective disposition in a first position generally parallel to, and overlying, said first planar member, a second position generally perpendicular to said first planar member, and a third position generally parallel to, and extending rearwardly from, said first planar member.

2. An improved luggage cart as recited in claim 1, wherein said first planar member is operatively connected between said pair of upright support members.

3. An improved luggage cart as recited in claim 2, further including back support means for supporting the back of a person seated on said second planar member when in said first and third positions.

4. An improved luggage cart as recited in claim 3, wherein said back support means comprises a support member operatively connected to said upper frame, and transversely extending between opposing sides thereof.

5. An improved luggage cart as recited in claim 1, wherein said first planar member comprises a child-carrying seat, said cart further including a horizontal retaining bar extending between said pair of upright support members, forwardly of, and generally parallel to, said axis about which said second planar member rotates, for inhibiting movement of a child out of the child's seat, and a leg dividing bar vertically oriented between the horizontal retaining bar and said first planar member, for inhibiting a child from twisting in the seat and climbing out from the seat.

6. An improved luggage cart as recited in claim 1 wherein said cart further includes a pair of flanges attached to one of said upright support members and together defining a generally vertically extending channel, and wherein said second planar member includes a nub receivable in said channel when said second member is in said second position, whereby said second member can be locked in said second position against rotation.

7. An improved luggage cart as recited in claim 4 wherein said cart further includes detachable means for maintaining said second member in said third position.

8. An improved luggage cart as recited in claim 7 wherein said maintaining means comprises at least one generally L-shaped member having, when attached to said cart, a generally vertical leg with a remote end attached at said support member connected to said upper frame, and a generally horizontal leg with a remote end attached at said axis about which said second planar member rotates, and wherein said L-shaped member is disposed to allow seating of said second planar member on said generally horizontal leg when said second member is in said third position.

9. An improved luggage cart as recited in claim 1, further including a foot rest mounted to the forward end of said cart and adjacent said primary support wheels; whereby an adult person seated on said second planar member, when it is in its first or third positions, can place his feet in resting engagement upon said foot rest.

10. An improved luggage cart as recited in claim 9, wherein said lower frame includes a retaining member mounted at said trailing end thereof and projected upwardly above said lower frame upper support surface to inhibit luggage from sliding rearwardly off of said upper support surface at said trailing end.

11. An improved luggage cart as recited in claim 10, wherein said cart construction is configured for matable nesting with carts of like configurations.

12. An improved luggage cart as recited in claim 11, wherein the outer shape of said lower frame tapers in the longitudinal direction, from a broad dimension at said forward end thereof to a relatively narrower dimension at said trailing end thereof; wherein said lower frame defines an open wheel passageway along said longitudinal axis from said forward end thereof and extending backward through said lower frame, toward said caster, said wheel passageway being transversely sized greater than the diameter of said caster to allow free rotation of said caster while in said wheel passageway; whereby when cooperatively nesting with a second such cart of like configuration, the lower frame trailing end of the second cart advances in the longitudinal direction, rearwardly past the lower frame forward end of the first cart and between said upright support members of said first cart, with the caster of said second cart advancing longitudinally rearward within the lower frame wheel passageway of said first cart.

13. An improved luggage cart as recited in claim 12, wherein said retaining member is pivotally mounted to said lower frame, wherein said retaining member can be pivoted to a position substantially flush with said upper support surface of said lower frame to preclude obstruction of said foot rest of the first cart by said retaining member of the second cart during nesting.

14. An improved luggage cart as recited in claim 12, wherein the general plane of said lower frame as mounted upon said wheel support means, defines an acute angle with a horizontal floor support surface upon which said wheel support means ride, wherein the acute angle opens in the direction from said forward end to said trailing end of said lower frame.

15. An improved luggage cart as recited in claim 14, wherein said acute angle is approximately from 5 to 15 degrees.

16. An improved luggage cart as recited in claim 15, wherein said acute angle is approximately 7 to 8 degrees.

17. An improved luggage cart as recited in claim 13, further including stop means mounted to said lower frame for cooperatively engaging said lower frame of a second cart of like-construction when said first and said second carts are in nesting engagement, such that the outer circumferential surface of said primary wheels of said first and said second carts, when nested, are longitudinally spaced and aligned with one another; whereby a large number of such nested carts can be readily directed and moved along curved paths without said primary wheels engaging each other.

18. An improved luggage cart as recited in claim 17, wherein said stop means comprise a pair of downwardly projecting stop members mounted to the bottom of said lower frame, one such stop member being mounted on each side of said wheel passageway; said stop members being equally spaced back from said forward end of said lower frame by a distance slightly larger than the diameter of said primary support wheels, and being operable to engage the forward end of the lower frame of a cart of like-construction nested therebehind.

19. An improved luggage cart as recited in claim 1, wherein said upper frame comprises a generally U-shaped continuous tubular member having its free ends mounted to said pair of upright support members and extending backward therefrom to a relatively long transversely connecting portion forming a handle for controlling movement of the cart; whereby the relatively wide nature of said handle at the back of said cart enables an operator to easily control movement of the cart from a position rearward to the cart, or from either side thereof, if walking alongside the cart.

20. An improved luggage cart as recited in claim 19, wherein said upper frame further includes a cross-brace transversely extending between the leg portions of said tubular U-shaped member and spaced slightly forward from the handle portion for supporting hanging objects therefrom.

21. An improved luggage cart as recited in claim 20, further comprising a loop projecting from said cart proximate said cross-brace and upwardly from said upper support surface of said upper frame, wherein wearing apparel suspended from clothing hangers can be draped across said upper support surface of said upper frame with shanks of the hangers hooked through said loop.

22. An improved luggage cart as recited in claim 21, wherein said loop comprises a non-linear rod aligned along said longitudinal axis of said upper frame and extending from said handle to said cross-brace.

23. An improved luggage cart as recited in claim 20, further comprising a purse suspension element extending generally longitudinally from one of said handle and said cross-brace and having a free end portion bent upwardly and back in an opposite longitudinal direction.

24. An improved luggage cart as recited in claim 19, wherein the longitudinal length of said upper frame member in the rearward direction exceeds that of said lower frame, such that said handle longitudinally lies rearward of a vertical plane passing through the trailing end of said lower frame.

25. An improved luggage cart as recited in claim 1, wherein said wheel support means are sized and spaced relative to one another, and said lower frame is mounted thereon and configured in a manner so as to enable said cart to be placed and used in a longitudinally stable upright manner on moving escalators.

26. An improved luggage cart as recited in claim 25, wherein the bottom surface of said lower frame is generally planar and smooth in the longitudinal direction along its constituent portions.

27. An improved luggage cart as recited in claim 25, wherein the relationship between the diameter of said primary support wheels and the diameter of said caster, and the relative longitudinal spacing between the mounting axes of said primary support wheels and said caster is such that when said primary support wheels supportingly rest on a first escalator step tread and said caster rests on an immediately adjacent escalator step tread, the bottom surface of said lower frame will not engage the underlying stair tread at any position along the lower frame.

28. An improved luggage cart as recited in claim 27, wherein said caster is free to rotate 360 degrees around its vertical support axis, and wherein said stable cart relationship on said adjacent escalator step treads exists both when the caster is disposed in a position which minimizes the longitudinal spacing between the caster and the primary support wheels as well as when the caster is disposed at a position which maximizes the longitudinal spacing between the caster and the primary support wheels.

29. An improved luggage cart as recited in claim 25, wherein said stable escalator design applies for both forward and backward orientation of said cart upon an escalator.

30. An improved multipurpose personalized cart apparatus of the type suitable for use in carrying luggage in transportation terminals or packages in shopping center complexes and the like, comprising:
  (a) a lower frame defining a broad upper surface suitable for carrying a plurality of relatively bulky items, said lower frame being generally symmetrically disposed about a longitudinal axis and extending between longitudinally spaced first and second ends, said lower frame having a retaining member mounted pivotally, proximate said second end thereof for movement between orientations generally parallel and generally perpendicular to said upper surface of said frame;
  (b) a pair of upright side support members mounted to said lower frame adjacent to said first end at opposite sides thereof, and rising generally vertically upward therefrom;
  (c) an upper frame portion operatively connecting and longitudinally extending from said pair of upright support members, generally symmetrically about a longitudinal axis, and terminating at a transverse handle portion for guiding said cart, said upper frame portion overlying, in spaced relationship, said lower frame;
  (d) first child seat means operatively mounted at said first end of said cart for supportably carrying a child in seated position, said child seat means comprising: a broad seat portion mounted transversely between said pair of upright side members and spaced above said lower frame, a back support upwardly extending from said seat member, and a retention bar mounted transversely between said upright support members and spaced above the general plane of said seat and generally parallel to said back support;
  (e) wheel support means operatively connected with said lower frame for movably supporting said cart over a floor surface, comprising:
    (i) a pair of primary support wheels coaxially mounted on said lower frame adjacent said first end and at oppositely disposed sides thereof; and
    (ii) caster means operatively mounted to said lower frame near said second end thereof, and rotatable about a generally upright axis, for enabling ease of steering movement of said cart;

wherein the combination of the manner in which said wheel support means supportively carry said lower frame, the relative sizing of said primary support wheels relative to said caster means, and the longitudinal spacing between said primary support wheels and said caster means adapt said cart to be placed upon and operatively used in a stable upright manner, on a moving escalator;

(f) conversion means operatively connecting with said first child seat means, for converting said child seat means into a seat suitable for supportive seating of an adult thereon; and (g) adaption means for adapting said conversion means to function as a second child seat.

31. An improved cart apparatus as recited in claim 30, wherein said conversion means comprises a second generally planar seat member pivotally mounted to said child seat back support, said second seat being pivotally movable about a pivot axis to cooperatively engage said retention bar, to form an adult seat overlying said child seat means.

32. An improved cart apparatus as recited in claim 30, further including a foot rest operatively mounted to said lower frame, extending forward of said first end thereof and adjacent said primary support wheels, for supporting the feet of an adult seated on said adult support seat.

33. An improved cart apparatus as recited in claim 30, wherein said caster means comprises a caster rotatably mounted to said lower frame along its longitudinal axis and adjacent said second end thereof; wherein the outer shape of said lower frame tapers in the longitudinal direction, from a broad dimension at said first end thereof to a relatively narrower dimension at said second end thereof; wherein said lower frame defines an open wheel passageway along said longitudinal axis from said first end thereof and extending backward through said lower frame, toward said caster, said wheel passageway being transversely sized greater than the diameter of said caster; whereby when cooperatively nesting with a second such cart of like-configuration, the lower frame second end of said second cart advances in the longitudinal direction, rearwardly past the first end of the lower frame of said first cart and between said upright side support members of said first cart, with the caster of said second cart advancing longitudinally rearward within the lower frame wheel passageway of said first cart.

34. An improved cart apparatus as recited in claim 33, wherein the general plane of said lower frame defines an acute angle with a horizontal floor support surface upon which said wheel support means ride, wherein the acute angle opens in the direction from said forward end to said trailing end of said lower frame.

35. An improved cart apparatus as recited in claim 34, wherein said acute angle is approximately from 5 to 15 degrees.

36. An improved cart apparatus as recited in claim 33, further including stop means mounted to said lower frame for cooperatively engaging said lower frame of a second cart of like-construction when said first and said second carts are in nesting engagement, such that the outer circumferential surfaces of said primary wheels of said first and said second carts, when nested, are longitudinally spaced and aligned with one another; whereby a large number of such nested carts can be readily directed and moved along curved paths.

37. An improved cart apparatus as recited in claim 36, wherein said stop means comprise a pair of downwardly projecting stop members mounted to the bottom of said lower frame, one such stop member being mounted on each side of said wheel passageway; said stop members being equally spaced back from said first end of said lower frame by a distance slightly larger than the diameter of said primary support wheels, and being operable to engage the first end of the lower frame portion of a cart of like-construction nested therebehind.

38. An improved cart apparatus as recited in claim 37, wherein except for said stop members, the bottom surface of said lower frame is generally planar and smooth in the longitudinal direction, along its constituent portions.

39. An improved cart apparatus as recited in claim 34, wherein the diameter of said primary support wheels is approximately 4 to 12 inches, and wherein said acute angle is approximately from 5 to 15 degrees.

40. An improved cart apparatus as recited in claim 39, wherein when said primary support wheels rest upon a first escalator step tread and said caster rests on an immediately adjacent escalator step tread, the bottom surface of said lower frame will not engage the underlying stair tread at any position along the lower frame, regardless of where said primary wheels and said caster are placed in the longitudinal direction upon said immediately adjacent escalator step treads.

41. An improved cart apparatus as recited in claim 40, wherein said caster is free to rotate 360 degrees about its support axis, and wherein said stable cart relationship on said escalator step treads exists both when the caster is disposed in a position which minimizes the longitudinal spacings between the caster and the primary support wheels, as well as when the caster is disposed at a position which maximizes the longitudinal spacing between the caster and the primary support wheels.

42. An improved cart apparatus as recited in claim 40, wherein said stable cart condition upon adjacent escalator steps applies for both forward and backward orientation of said cart upon an escalator.

* * * * *